Legend:
- Fuel consumed at a moderate rate
- Rapidly burned fuel
- Slowly consumed fuel INVENTOR.
David G. Holloway

3,120,737
ROCKET MOTOR PROPELLANT
David G. Holloway, Carter Hill Road, R.F.D. 1, Concord, N.H.
Filed Feb. 17, 1961, Ser. No. 90,148
3 Claims. (Cl. 60—35.6)
(Granted under Title 35, U.S. Code (1952), sec. 266)

The invention described herein may be manufactured and used by or for the Government of the United States of America for governmental purposes without the payment of any royalties thereon.

The present invention relates to a solid propellant rocket motor and more particularly to a rocket motor whose propelling charge is comprised of a plurality of fuel ring elements having different rates of burning in order that desired shapes of the unburned portion of the propellant may be obtained.

Solid propellant motors, in the present state of the art, are generally comprised of a cylindrically shaped outer sleeve having contained therein a chemical composition usually having an axial bore to provide for greater surface burning area. Attached to one end of such outer sleeve is a conventional exhaust nozzle to increase the thrust efficiency of the expelled gases.

Although such prior art motors have served their intended purpose, they have not proved wholly satisfactory for the reason that the conventional thrust producing nozzle, comprised of heavy, inert material, is carried aloft by the motor as a drag load.

The improvement in solid propellant rocket motors as contemplated by the various embodiments of this disclosure resides in augmenting the thrust from such conventional nozzles by providing an additional nozzle formed from the face of the unburned portion of the fuel. Additionally, the conventional nozzle may be entirely dispensed with, either initially or at some time during the flight, thereby utilizing only the relatively light-weight, consumable fuel-nozzle to develop the required thrust.

Accordingly, an object of this invention is to increase the thrust-to-weight ratio of solid fuel rocket motors.

Another object is to produce a rocket motor whose fuel charge is comprised of a plurality of individual disc elements.

A further object is to apportion the burning rate of the propellant discs so that at burning, desired configurations will be formed from the unburned portion of the fuel.

A still further object is to produce a rocket motor whose fuel charge is a substantially homogeneous composition having a pre-shaped axial bore in the form of a thrust nozzle.

Figure 1:
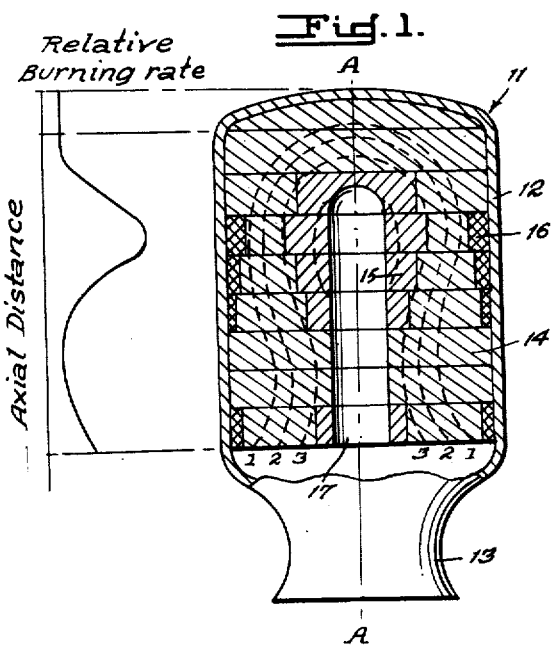
Figure 2:
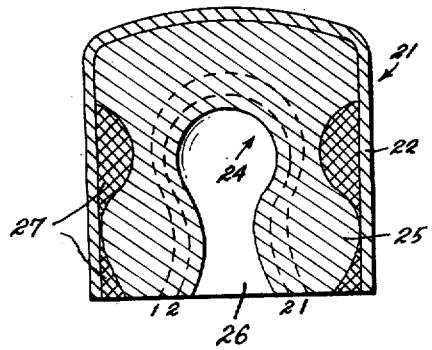

These and other objects and features of the invention will become apparent to those skilled in the art as the disclosure is made in the following description of the preferred embodiments of the invention as illustrated in the annexed drawings wherein:

FIGURE 1 illustrates a sectioned view of a rocket motor employing concentric fuel rings, together with a graphic indication of relative burning rate vs. axial distance; and FIGURE 2 illustrates a modification of the invention containing a fuel composition having a pre-shaped axial cavity.

Referring now to the drawings wherein like reference characters designate like or corresponding parts, there is shown in FIGURE 1 a solid fuel rocket motor 11 comprised of a suitable sleeve or casing 12, a conventional thrust nozzle 13 integrally connected to casing 12, and a plurality of solid fuel rings 14, 15, and 16 concentrically disposed relative to each other along the axis A—A of motor 11. Each of the rings 14 is aperteured through its center thus forming axial bore 17 when assembled into the motor 11. Since each of rings 14, 15 and 16 has a rate of burning which corresponds to the legend on the drawing, it can now be readily seen that upon ignition of the propellant charge along bore 17, the fuel rings 14, 15 and 16 will burn unevenly, according to their burning rate, thereby forming a nozzle from the unburned fuel, i.e. as burning continues, the axial bore will successively assume the shapes indicated by dotted lines 1—1, 2—2, and 3—3. Fuel rings 16 of slowly consumed fuel are located adjacent casing 12 at critical locations to prevent burning through the casing walls. At ignition the bottom of the bore 17 forms the constriction of the burning gases to provide the thrust until such time as there is sufficient consumption of part of the charge as indicated by the dotted lines of FIGURE 1, and thereafter the rocket motor 11 operates with a nozzle within the propellant. When a sufficient quantity of fuel has been consumed so that the mouth of the nozzle in the propellant is wider than the nozzle 13, then for the remainder of the burning period, the gases will be constricted in the nozzle of the propellant and will be again constricted at the nozzle 13 for additional thrust. Thus, it is now-apparent that a thrust nozzle, of the type herein disclosed formed from the unburned portions of the propellant, acts in tandem with the conventional external nozzle 13 to augment the thrust of rocket motor 11.

With reference to FIGURE 2, there is illustrated an alternative embodiment of the instant invention wherein a solid fuel rocket motor 21 is comprised of an external casing 22 and a fuel charge 24 having an axial cavity 26 pre-shaped in the form of a nozzle, thereby permitting the use of a constant rate-of-burning fuel composition 25, except for selected portions 27 adjacent the outer casing walls where a relatively slow burning fuel is disposed so as to prevent hot spots which could ultimately rupture the casing and about the flight of the rocket. As burning continues, the unburned portion of the fuel will assume the shapes indicated by lines 1—1 and 2—2.

A further embodiment would be to employ the structure illustrated in FIGURE 1 but where the external nozzle portion is separated after a predetermined period of flight during which the fuel nozzle has had an opportunity to be formed in order that the fuel nozzle itself would provide sufficient thrust to fulfill the intended mission of the motor.

It is to be understood, of course, that the foregoing disclosure relates only to preferred embodiments of the invention and that modifications or alterations may be resorted to without departing from the spirit of the invention and the scope of the appended claims.

What is claimed and desired to be secured by Letters Patent of the United States is:

1. A rocket motor having nozzles disposed in tandem and comprised of an outer steel casing, a nozzle portion integral with said casing, a solid fuel charge located interiorly of said casing and having an axial aperture therein, the fuel charge surface exposed by said aperture having selected portions thereof of varying lateral burning rate so arranged that when ignited a nozzle shaped chamber is formed by the face of the unburned portion of said charge.

2. A solid propellant charge comprising a series of axially disposed discs stacked together having a central axial cavity of uniform diameter, each of said discs forming concentric rings around said cavity and made of slow-burning and fast-burning propellant, the discs of propellant so arranged internally that upon ignition the consumption of the fast-burning propellant changes the cavity to nozzle-shape, said nozzle-shaped cavity thereafter retained during the burning period by the particular arrangement of the propellant in each of the discs continually maintaining the nozzle-shape of the cavity by the unburnt surface of the slow-burning propellant.

3. A rocket motor comprising an outer steel casing, a nozzle integral with said casing, a solid fuel charge located interiorly of said casing and having an axial cavity therein, the fuel charge surface exposed by said cavity having selected portions of varying lateral burning rate so arranged that upon ignition the cavity is changed to a nozzle shaped cavity in axial alignment with the casing nozzle, said nozzle shaped cavity being formed by the face of the unburned portion of said charge to produce the additional thrust developed by nozzles in tandem.

References Cited in the file of this patent

UNITED STATES PATENTS

| | | |
|---|---|---|
| 1,901,852 | Stolfa et al. | Mar. 14, 1933 |
| 2,043,268 | Skinner | June 9, 1936 |
| 2,247,111 | Batchelor et al. | June 24, 1941 |
| 2,721,518 | Hickman | Oct. 25, 1955 |
| 2,912,820 | Whitmore | Nov. 17, 1959 |
| 3,017,746 | Kiphart | Jan. 23, 1962 |
| 3,023,570 | Crouch | Mar. 6, 1962 |
| 3,032,970 | Fox | May 8, 1962 |
| 3,052,092 | Kirkbride | Sept. 4, 1962 |

OTHER REFERENCES

Ser. No. 159,143, Zwerina (A.P.C.), published June 8, 1943.